US006799019B1

(12) United States Patent
Eilts

(10) Patent No.: US 6,799,019 B1
(45) Date of Patent: Sep. 28, 2004

(54) METHOD AND SYSTEM FOR ACCOMODATING PROCESSING DELAY IN A CELLULAR BASE STATION

(75) Inventor: Henry S. Eilts, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/868,663

(22) Filed: Jun. 4, 1997

Related U.S. Application Data

(60) Provisional application No. 60/018,959, filed on Jun. 4, 1996.

(51) Int. Cl.[7] .................................................. H04Q 7/30
(52) U.S. Cl. ......................... 455/101; 370/321; 370/347
(58) Field of Search ................................ 455/561, 423, 455/101; 370/321, 347, 442, 294, 280

(56) References Cited

U.S. PATENT DOCUMENTS

| | | | |
|---|---|---|---|
| 5,007,042 A | * | 4/1991 | Santi |
| 5,208,812 A | * | 5/1993 | Dudek et al. |
| 5,228,026 A | * | 7/1993 | Albrow et al. |
| 5,416,779 A | * | 5/1995 | Barnes et al. |
| 5,553,077 A | * | 9/1996 | Martinez Garcia et al. . 370/347 |
| 5,710,765 A | * | 1/1998 | Lee et al. .................... 370/321 |
| 5,812,935 A | * | 9/1998 | Kay ............................ 455/101 |
| 5,887,037 A | * | 3/1999 | Golden et al. .............. 375/347 |

* cited by examiner

Primary Examiner—William Cumming
(74) Attorney, Agent, or Firm—Wade James Brady, III; Frederick J. Telecky, Jr.

(57) ABSTRACT

A mobile telephone system and method having a base station for receiving data bursts during consecutive frames, each frame of predetermined time duration and divided into a plurality of slots of predetermined time duration. The base station has an antenna, base station electronics and preprocessing circuitry coupled to the base station antenna and the base station electronics. Delay circuitry is coupled to the base station preprocessing circuitry and base station electronics to provide the complement of a total time delay to the data bursts through the preprocessing circuitry and the delay circuitry equal to an integral number of the predetermined time duration of a frame. The time delay of the preprocessing circuitry can be fixed or variable, in which case the time delay of the delay circuitry is either fixed or variable, respectively. In the case of variable delay, the delay circuitry will include circuitry to monitor the time delay provided by the preprocessing circuitry and adjust the delay in the delay circuit in accordance with the monitored.

20 Claims, 2 Drawing Sheets

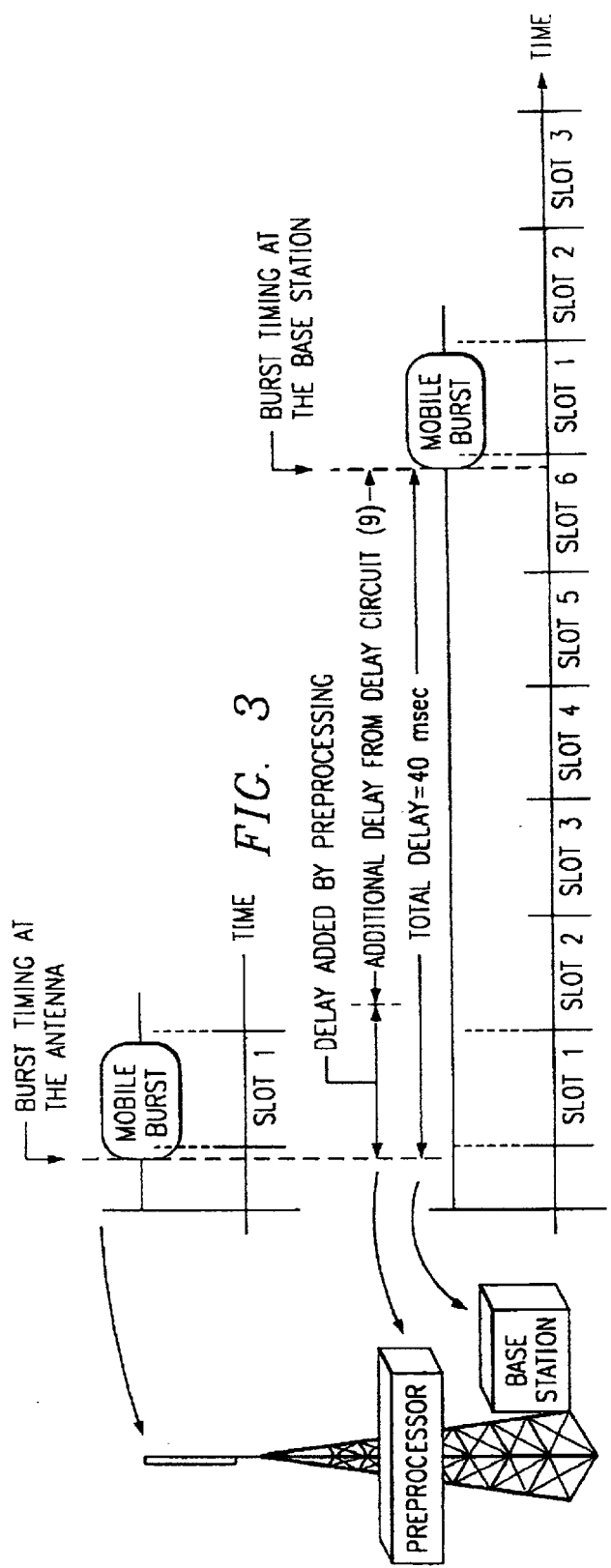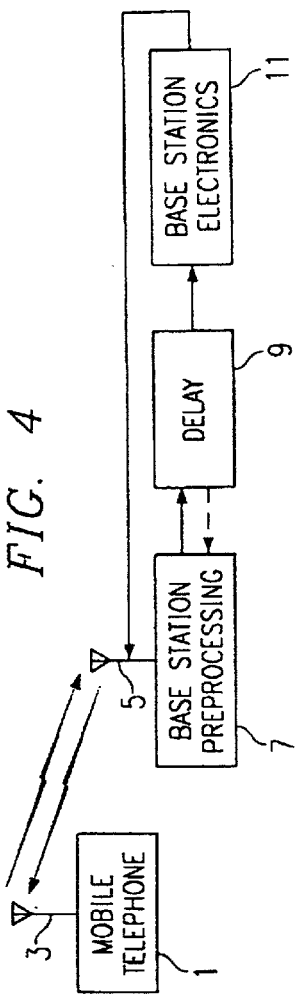

METHOD AND SYSTEM FOR ACCOMODATING PROCESSING DELAY IN A CELLULAR BASE STATION

CROSS REFERENCE TO PRIOR APPLICATIONS

Priority is hereby claimed under 35 U.S.C. 119(e)(1) based upon Provisional Application Serial No. 60/018,959, filed Jun. 4, 1996.

BACKGROUND OF THE INVENTION

1. Field of the Invention

This invention relates to cellular mobile telephone systems in general and, more specifically, to a method of accommodating delays introduced into the mobile telephone system due to preprocessing of the received signals at the base station.

2. Brief Description of the Prior Art

In time division multiple access (TDMA) cellular telephone systems, particularly as used in the United States (IS-54 and IS-136), each mobile telephone is assigned time slots in which to send digitally modulated radio frequency (RF) data bursts. To perform properly, it is vital that the data bursts from the mobile telephone arrive at the base station at the correct time (i.e., in the correct time slots, without overlap into the preceding or succeeding time slots). Several mechanisms are presently in place in the standards and protocols to insure that this problem is avoided.

Two principal prior art methods are in the standards to facilitate the proper timing of the data burst transmissions. First, an equalization/timing sequence (commonly called the sync word) is transmitted in each RF data burst in addition to the data. The receivers at the base station determine the exact time of arrival of the sync word (and hence the entire data burst) by means of correlation of a locally generated sequence (i.e., generated at the base station) with the received sequence. After determining the timing error, the base station sends timing correction information to the mobile telephone. The mobile telephone then corrects its transmit timing. In this manner, the timing error is maintained at an acceptably small value. This mechanism is accomplished to correct for timing advances or delays caused by motion of the mobile user.

The second prior art method in the standards is provided to accommodate the initial transmission of the mobile telephone. At the first transmission of the mobile telephone, there have been no previous timing corrections from the base station, and the mobile telephone has only a coarse estimate of proper transmit timing. Therefore, its initial transmission can have considerable timing error. The timing error in the initial transmissions can be large enough to cause the data burst received at the base station to overlap into preceding or following time slots, thus interfering with other telephone conversations. To prevent this from occurring, the initial transmission is made with a shortened burst containing multiple repetitions of the sync word in a unique sequence. The burst is shortened to allow for greater timing error without the possibility of overlap into adjacent time slots. The unique sequence of sync words is provided so that the base station can determine the arrival time of the data burst without ambiguity and without extensive searching for a received sync word. The base station determines the arrival timing of the initial transmission and sends timing corrections back to the mobile telephone to be implemented as in the previous description. Once initial timing corrections are made, remaining transmissions from the mobile telephone proceed with normal (i.e., not shortened) data bursts. Thus, the initial transmissions of the mobile telephone as well as succeeding transmissions are assured of arriving at the base station totally within the correct time slots. This mechanism is essential to avoid simultaneous arrivals of multiple mobile signals (collisions) at the base station. A diagram of the above described prior art procedure is set forth in FIG. 1.

In some applications, it is desired to preprocess the signals received at the base station in a separate processor prior to feeding the signals to the base station electronics. One such application is known as "smart" or signal processing antenna. In this arrangement, the antenna processing is placed in the signal path between the base station antenna elements and the base station electronics signal inputs. The placement of the antenna processing in this position adds delay to the signals, this causing the arrival times of the processed signals at the base station electronics to be in error by the amount of the processing delay, in addition to error of the type discussed above with reference to FIG. 1. Very short preprocessing delays (i.e. a small fraction of a slot time) can be handled as an error and corrected as a part of the error correction as discussed above with regard to FIG. 1. However, if the delay becomes larger (i.e, on the order of one tenth of a slot time or greater), such a large delay cannot be handled by the error correction discussed in conjunction with FIG. 1 and requires a different approach because a large preprocessing delay precludes the base station from making an arrival time measurement. Accordingly, if such delays are permitted to exist, the base station cannot make a correct timing measurement of the type discussed above with reference to FIG. 1 and the system will fail. This problem is depicted by the diagram in FIG. 2.

SUMMARY OF THE INVENTION

In accordance with the present invention, there is provided a solution to the problem as described hereinabove without disturbing the normal timing mechanism of the base station or requiring any reprogramming of the base station software.

Briefly, the signalling structure in the mobile telephone system is organized into consecutive, non-overlapping frames, each frame having the same predetermined time duration. Each frame is broken down into a predetermined number of consecutive non-overlapping time slots. The base station receives the RF data bursts from the cellular mobile telephone as in the prior art and the base station electronics measures the times of arrival of the digital data bursts on a time slot basis as in the prior art for each time slot and transmits timing correction data back to each mobile telephone as in the prior art. In other words, a measurement of data burst arrival time is made during each time slot and timing corrections are derived at the base station and transmitted back to the originating mobile telephone.

In order to accomplish the above, it is necessary that the delay introduced by the preprocessing circuitry be compensated for. This is accomplished by providing additional delay circuitry between the preprocessing circuitry and the base station electronics to provide the complement of the delay caused by the preprocessing circuitry and a frame time (i.e, the delay in the preprocessing circuitry plus the delay from the delay circuit is equal to an integral number of frame times). This is shown in FIG. 4. The time delay of the preprocessing circuitry can be fixed, in which case the time delay of the delay circuitry is fixed. The time delay of the preprocessing circuitry can also be variable, changing in response to the signals at the preprocessor inputs, in which case the time delay of the delay circuitry is made variable, preferably on-line. In the case of variable delay, the delay circuitry includes circuitry and/or software to monitor the time delay introduced by the preprocessing circuitry and adjusts the delay in the delay circuit in accordance with the monitored delay in the preprocessing circuitry. The changes in time delay through the preprocessing circuitry can be caused by code accompanying a change in the data entering the base station antenna (i.e., in response to the type of signal (e.g., noisy, not noisy, etc.) entering the base station antenna). Thus, the burst transmission of a given mobile telephone arrives at the base station electronics in the proper slot and with the proper timing relative to the slot, albeit with a time delay of an integral number of full frames (i.e., one or more). Since the base station makes measurements on a time slot basis, the base station is unaware of the delay and computes the timing corrections as if there were no additional delay, which is the desired result.

It can be seen that, in accordance with the circuitry and procedure as described above, preprocessing with built in delay can be provided without disturbing the normal timing mechanism of the base station or reprogramming of the base station software. The system continues to operate as in the prior art with timing correction available and in use as described above in connection with FIG. 1.

BRIEF DESCRIPTION OF THE DRAWINGS

FIG. 3 is a schematic diagram showing a procedure in accordance with the present invention for compensation for the added delay due to preprocessing;

FIG. 4 is a block diagram showing a cellular telephone base station with circuitry to provide compensation in accordance with the present invention.

DESCRIPTION OF THE PREFERRED EMBODIMENT

Figure 1:
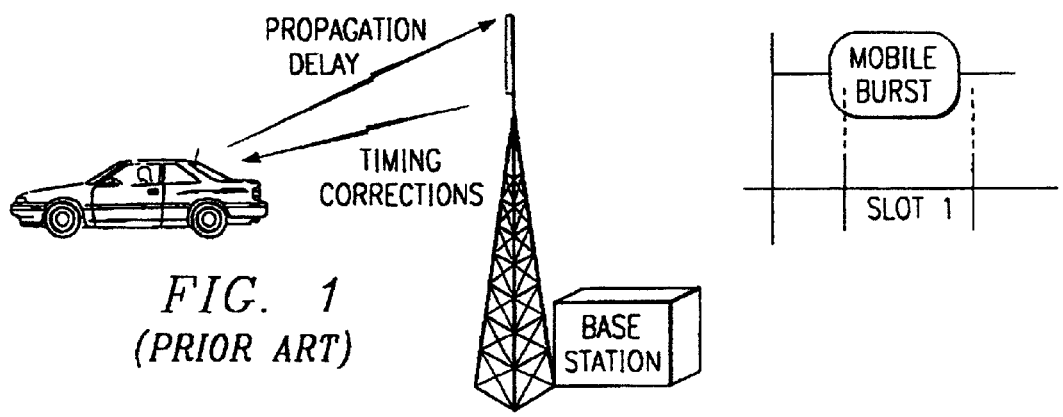
FIG. 1 is a schematic diagram showing timing correction in cellular mobile telephone systems in accordance with the prior art.
Figure 2:
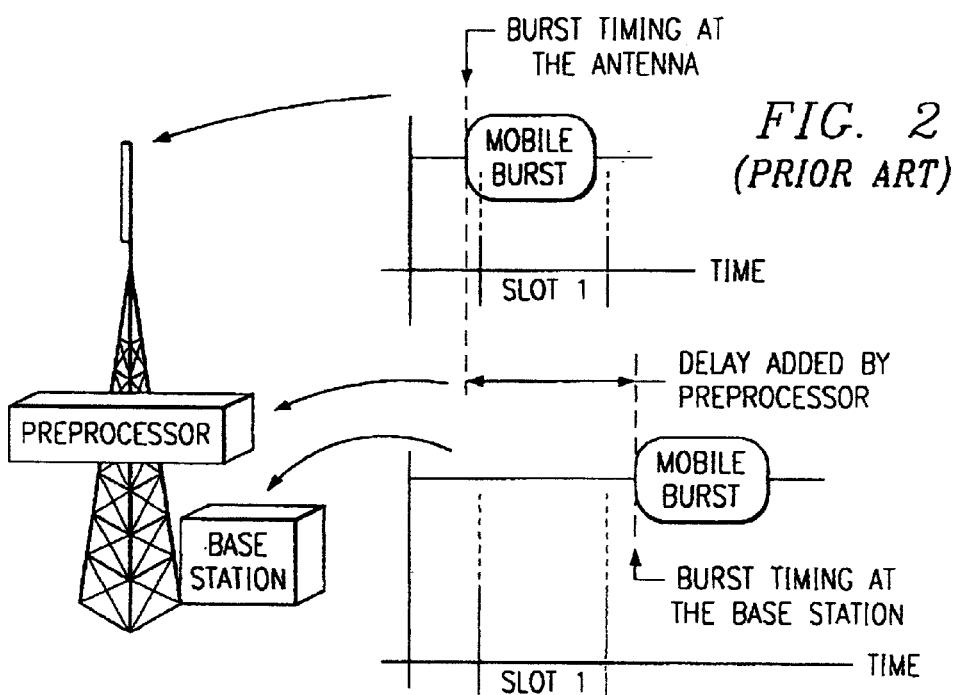
FIG. 2 is a schematic diagram showing how delay is introduced into the signals received at the base station due to preprocessing between the base station antenna and base station electronics in accordance with the prior art.

Referring to FIGS. 3 and 4, initially the signalling structure is organized into 40 millisecond frames, each frame having six time slots of 6.67 milliseconds each as shown in FIG. 3. The mobile telephone 1 (FIG. 4) then transmits an initial RF data burst via its antenna 3 as in the prior art having a time duration of no more than 6.67 milliseconds. This signal burst is received at the base station antenna 5 and preprocessed in the base station preprocessing circuitry as in the prior art to introduce a preprocessing delay which is known or which can be determined.

A delay circuit 9 is provided between the base station preprocessing circuitry 7 and the base station electronics 11. The delay circuit 9 adds delay to the output of the base station preprocessing circuitry so that the sum of the delay introduced by the base station preprocessing circuitry and the delay added by the delay circuit 9 is an integral number of full frames (i.e., one or more), in this case a multiple of 40 milliseconds. The delay introduced by the delay circuit 9 can be fixed if it is known that the base preprocessing circuitry 7 will always introduce the same delay. If the delay introduced by the base station preprocessing circuitry is variable, the delay circuitry 9 is designed to continually monitor the delay introduced by the base station preprocessing circuitry on-line and continually alter the delay introduced by the delay circuitry to compensate for the delay of the preprocessing circuitry. In this way, a total delay amounting to a time equal to an integral number of frames is always provided.

In a digital signal processing (DSP) based preprocessor 7, the variable delay can be monitored, for example, by monitoring the individual preprocessing tasks being performed and by a priori timing measurements of these individual tasks. The monitor software keeps an itemized list of the tasks performed and a running total of the accumulated preprocessing delay time for each data burst processed. When the preprocessing for a burst is completed, the running total is used to set the delay time in the delay circuitry 9. The result is that the output of the delay circuitry 9 is identical in time to what it would have been without the base preprocessing circuitry 7 being present except that it is delayed an integral number of frames. In this way, the base station electronics can determine the timing error of the incoming data bursts from the mobile telephone 1 as in the prior art and transmit the timing correction required back to the mobile telephone 1 as described above with reference to FIG. 1.

Figure 5:
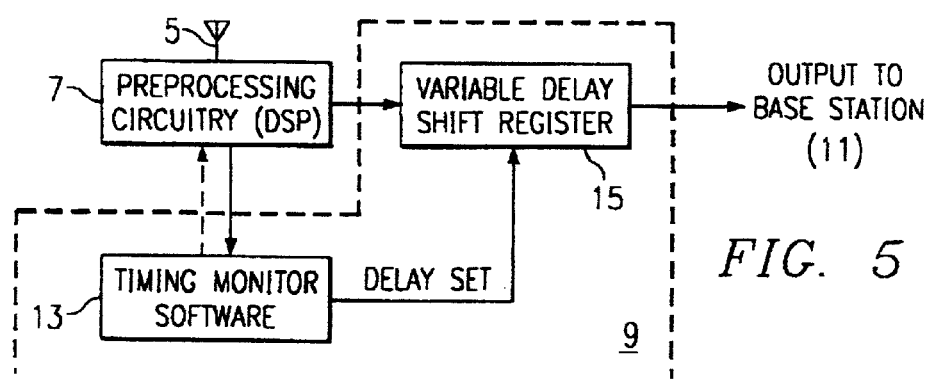
FIG. 5 is a block diagram showing a preferred delay circuit which can be used in accordance with the present invention.

A circuit of the type described is shown in FIG. 5 where timing monitor software 13 is provided to oversee the preprocessing tasks and keep track of the preprocessing time. The output of the preprocessing circuitry is fed to a shift register with variable delay 15. After a burst is preprocessed, the timing monitor computes preprocessing delay and sets the delay of the shift register 15 equal to the frame complement of the preprocessing delay. The frame complement is the smallest integer frame time minus the calculated delay such that the frame complement is a positive number.

Another possibility for variable delay control involves the injection of a timing signal at the start of the preprocessing and the measurement of the time at which the timing signal exits the preprocessor.

Though the invention has been described with reference to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. In a mobile telephone system having a remote mobile station for transmitting data bursts and a base station for receiving said data bursts during consecutive frames, each of said frames being of predetermined time duration, each said frame being divided into a plurality of slots of predetermined time duration, said base station having an antenna, base station electronics and preprocessing circuitry coupled to said base station antenna and said base station electronics:

delay circuitry coupled to said base station preprocessing circuitry and said base station electronics to provide the complement of a total time delay to said data bursts through said preprocessing circuitry and said delay circuitry equal to an integral number of said predetermined time duration of a said frame.

2. The system of claim 1 wherein the time delay of said preprocessing circuitry is fixed and the time delay of said delay circuitry is fixed.

3. The system of claim 1 wherein the time delay of said preprocessing circuitry is variable and the time delay of said delay circuitry is variable.

4. The system of claim 3 further including means forming a part of said delay circuitry to monitor the time delay provided by said preprocessing circuitry and to adjust the delay in said delay circuit in accordance with the monitored delay in said preprocessing circuitry.

5. A method for accommodating processing delays in a cellular base station comprising the steps of:
   (a) providing a mobile telephone system having a remote mobile station for transmitting data bursts and a base station for receiving said data bursts during consecutive frames, each of said frames being of predetermined time duration, each said frame being divided into a plurality of slots of predetermined time duration, said base station having an antenna, base station electronics and preprocessing circuitry coupled to said base station antenna and said base station electronics;
   (b) determining the delay introduced by said preprocessing circuitry; and
   (c) providing the complement of a total time delay to said data bursts through said preprocessing circuitry equal to an integral number of said predetermined time duration of a said frame.

6. The method of claim 5 wherein the time delay of said preprocessing circuitry is fixed and said complement is fixed.

7. The method of claim 5 wherein the time delay of said preprocessing circuitry is variable and said complement is variable.

8. The method of claim 7 further including the step of monitoring the time delay provided by said preprocessing circuitry and adjusting said complement in accordance with the monitored delay in said preprocessing circuitry.

9. The method of claim 5 wherein said step of determining said delay comprises the steps of providing a variable delay circuit, determining on-line the delay of said preprocessing circuitry and setting the delay of said variable delay circuit responsive to determination of the delay of said preprocessing circuitry.

10. The method of claim 7 wherein said step of determining said delay comprises the steps of providing a variable delay circuit, determining on-line the delay of said preprocessing circuitry and setting the delay of said variable delay circuit responsive to determination of the delay of said preprocessing circuitry.

11. The method of claim 8 wherein said step of determining said delay comprises the steps of providing a variable delay circuit, determining on-line the delay of said preprocessing circuitry and setting the delay of said variable delay circuit responsive to determination of the delay of said preprocessing circuitry.

12. The system of claim 1 further including means at said base station for causing adjustment of the timing of transmission of said data bursts from said mobile transmitter.

13. The system of claim 2 further means at said base station for causing adjustment of the timing of transmission of said data bursts from said mobile transmitter.

14. The system of claim 3 further means at said base station for causing adjustment of the timing of transmission of said data bursts from said mobile transmitter.

15. The system of claim 4 further including a mobile transmitter remote from said base station and means at said base station for causing adjustment of the timing of transmission of said data bursts from said mobile transmitter.

16. The method of claim 5 further including the step causing adjustment of the timing of transmission of said data bursts from said mobile transmitter responsive to a transmission from said base station.

17. The method of claim 6 further including the step of causing adjustment of the timing of transmission of said data bursts from said mobile transmitter responsive to a transmission from said base station.

18. The method of claim 7 further including the step of causing adjustment of the timing of transmission of said data bursts from said mobile transmitter responsive to a transmission from said base station.

19. The method of claim 8 further including the step of causing adjustment of the timing of transmission of said data bursts from said mobile transmitter responsive to a transmission from said base station.

20. The method of claim 9 further including the step of causing adjustment of the timing of transmission of said data bursts from said mobile transmitter responsive to a transmission from said base station.

* * * * *